United States Patent
Chen

(10) Patent No.: US 11,891,469 B2
(45) Date of Patent: Feb. 6, 2024

(54) URETHANE ACRYLATE COMPOSITION

(71) Applicant: STRATASYS, INC., Eden Prairie, MN (US)

(72) Inventor: Liang Chen, Sewickley, PA (US)

(73) Assignee: STRATASYS, INC., Eden Prairie, MN (US)

( * ) Notice: Subject to any disclaimer, the term of this patent is extended or adjusted under 35 U.S.C. 154(b) by 0 days.

(21) Appl. No.: 17/359,939

(22) Filed: Jun. 28, 2021

(65) Prior Publication Data
US 2022/0411560 A1    Dec. 29, 2022

(51) Int. Cl.
| C08F 2/46 | (2006.01) |
|---|---|
| C08F 2/50 | (2006.01) |
| C08G 61/04 | (2006.01) |
| C08F 283/00 | (2006.01) |
| B33Y 70/00 | (2020.01) |
| B33Y 10/00 | (2015.01) |
| B29C 64/124 | (2017.01) |
| B29K 75/00 | (2006.01) |

(52) U.S. Cl.
CPC .......... C08F 283/006 (2013.01); B33Y 70/00 (2014.12); B29C 64/124 (2017.08); B29K 2075/00 (2013.01); B33Y 10/00 (2014.12)

(58) Field of Classification Search
CPC ...... C08G 18/44; C08G 18/10; C08G 18/755; C08G 18/672; C08F 283/006; C08F 290/067; C08F 220/1811; C08F 220/34; B33Y 70/00; B33Y 10/00; C09D 175/16; B29C 64/124; B29K 2075/00
USPC ............... 522/134, 1, 6, 71, 189, 184; 520/1
See application file for complete search history.

(56) References Cited

U.S. PATENT DOCUMENTS

| 9,453,142 B2 | 9/2016 | Rolland et al. |
|---|---|---|
| 2016/0137839 A1 | 5/2016 | Rolland et al. |
| 2020/0362157 A1 * | 11/2020 | Parkar ................ C08G 18/8116 |
| 2021/0017381 A1 | 1/2021 | Scholte et al. |
| 2021/0054125 A1 | 2/2021 | Achten et al. |
| 2022/0118690 A1 | 4/2022 | Pinschmidt, Jr. et al. |

FOREIGN PATENT DOCUMENTS

| WO | 2018104223 A1 | 6/2018 | |
|---|---|---|---|
| WO | 2019103855 A1 | 5/2019 | |
| WO | WO-2019103855 A1 * | 5/2019 | ......... A61C 13/0013 |
| WO | WO-2022096496 A1 * | 5/2022 | |

OTHER PUBLICATIONS

Bueckmann et al., WO 2022/096496 Machine Translation, May 12, 2022 (Year: 2022).*
Velankar, Sachin et al, J. Appl. Polym. Sci. vol. 62, 1361-1376 (1996).
Ligon-Auer, Samuel Clark et al, Polym. Chem., 2016, 7, 257.
Konuray, Osman et al, Polymers 2018, 10, 178.
Oraby, Wadida et al, J. Appl. Polym. Sci. vol. 23, 3227-3242 (1979).
Product Data Sheet, Omnirad 1173 (formerly Igacure 1173) Photoinitiator, IGM Resins B.V., Jun. 9, 2016.

* cited by examiner

*Primary Examiner* — Jessica Whiteley
(74) *Attorney, Agent, or Firm* — Faegre Drinker Biddle & Reath LLP

(57) ABSTRACT

Provided is a photopolymerizable composition comprising a blend of: a) from 40 wt. % to 70 wt. % of at least one urethane component; b) from 25 wt. % to 70 wt % of at least one monofunctional reactive diluent; c) from 0.1 wt. % to 5 wt. % of at least one initiator; and d) from 2 wt. % to 10 wt % of an amine-functional (meth)acrylate monomer. Also provided is a process of producing a photopolymerizable composition by blending these ingredients. Further provided is a process of producing a three-dimensional object, by depositing the photopolymerizable composition atop a carrier; depositing additional photopolymerizable composition atop a previously applied layer wherein the depositing of the photopolymerizable composition comprises introducing energy.

11 Claims, No Drawings

URETHANE ACRYLATE COMPOSITION

FIELD OF THE INVENTION

The present invention relates in general to additive manufacturing, and more specifically to urethane acrylate compositions for use in three-dimensional (3D)-printing processes.

BACKGROUND OF THE INVENTION

Photo-curable resins based on multifunctional (meth)acrylate monomers are commonly applied as thin films (e.g. protective coatings, printing inks) and in recent years are also used for the fabrication of bulk objects such as dental fillings and 3D-printed parts. Urethane (meth)acrylate (UA) prepolymers are particularly attractive for 3D-printing applications due to their outstanding flexibility, abrasion resistance, and weatherability. An immense number of patents were filed to capture the innovative UV-curable urethane (meth)acrylate prepolymers. Many UA resin formulations have been commercially available for the past few decades. In the typical UV resin formulation, UA prepolymers provide mechanical toughness, tear strength, and abrasion resistance. Vinyl monomers are added to reduce the resin viscosity to improve the processability and/or modify the physical properties (e.g. thermal resistance, weatherability). Many factors affect the mechanical properties of crosslinked UA resin formulations including, for example (a) the ratio of hard and soft segments in UA prepolymer, (b) the molecular weight of prepolymer (c) the concentration and nature of reactive diluents, and (d) the curing process.

Research in UA prepolymers has shown that oftentimes these materials have mechanical properties that are inferior to those of thermoplastic polyurethanes with a very similar composition owing to the high cross-link density in prepolymers; in particular, their ultimate elongation is low (less than 100%). In many demanding applications, it is highly desirable to increase polymer toughness. For example, UV-cured resins are desired which have both high tensile strength and high elongation at break. In the past, different approaches of increasing the ultimate extension were attempted which resulted in compromising the advantages of the UV cure chemistry.

The dual cure strategy has gained tremendous popularity to address property tradeoffs. A dual-curing process is defined as a combination of two curing reactions taking place simultaneously or sequentially. It allows for the combination of two otherwise distinct polymer networks. For example, tensile strength can be enabled without sacrificing the tensile elongation at break.

Another approach uses thiols or mono- and difunctional β-allyl sulfones as addition-fragmentation chain transfer (AFCT) reagents, which allows a method for modifying the growth of the polymer network. These strong chain transfer agents can slow down the polymerization rate and it is sometimes difficult to achieve the desired physical properties.

One example for increasing the elongation at break while maintaining the high tensile strength in UV-cured resins is to use a special reactive diluent. Oraby and Walsh in *J. Appl. Polym. Sci.*, Vol. 23, 3227-3242 (1979), showed UV-cured UA prepolymer with 2-(diethylamino)ethyl acrylate (DEAEA) has a high elongation at break compared with other reactive diluent monomers. It was proposed that DEAEA has a significant chain transfer constant, thus reducing the degree of polymerization of the acrylic end groups. As a result, this may minimize the formation of multi-ray-shaped crosslinks producing a looser structure. Such an approach used a large quantity of DEAEA, and the UV-curing reaction rate was significantly reduced. Also, the resulting polymer from DEAEA was hydrophilic, so the resulting cured resin had high water absorption.

To reduce or eliminate problems, therefore, a need continues to exist in the art for a simple approach to enhance the tensile properties of cured resins without hindering the curing process.

SUMMARY OF THE INVENTION

Accordingly, the present invention provides a simple approach to enhance the tensile properties of cured additive manufacturing resins without hindering the curing process, the approach involving adding from 2 wt. % to 10 wt % of at least one amine-functional (meth)acrylate monomer of formula, $C=C-CO-O-R_1-NR_2R_3$ (I) to the resin, wherein at least one of $R_1$, $R_2$, and $R_3$ is an alkyl group, and wherein the at least one amine-functional (meth)acrylate monomer is not an amide. These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about."

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," "certain embodiments," or the like, means that a particular feature or characteristic may be included in an embodiment. Thus, use of the phrase "in various non-limiting embodiments," "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various or certain embodiments may be combined, in whole or in part, with the features or characteristics of one or more other embodiments without limitation. Such modifications and variations are intended to be included within the scope of the present specification.

The grammatical articles "a", "an", and "the", as used herein, are intended to include "at least one" or "one or more", unless otherwise indicated, even if "at least one" or "one or more" is expressly used in certain instances. Thus, these articles are used in this specification to refer to one or more than one (i.e., to "at least one") of the grammatical objects of the article. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As used herein, the term "polymer" encompasses pre-polymers, oligomers, and both homopolymers and copolymers; the prefix "poly" in this context refers to two or more. As used herein, the term "molecular weight", when used in reference to a polymer, refers to the number average molecular weight, unless otherwise specified.

In a first aspect, the present invention is directed to a photopolymerizable composition comprising a blend of: a) from 40 wt. % to 70 wt. % of at least one urethane component; b) from 25 wt. % to 70 wt % of at least one monofunctional reactive diluent; c) from 0.1 wt. % to 5 wt. % of at least one initiator; and d) from 2 wt. % to 10 wt % of an amine-functional (meth)acrylate monomer of formula, C=C—CO—O—R$_1$—NR$_2$R$_3$(I); e) optionally, at least one multiple-functional reactive diluent; f) optionally, from 0.001 wt. % to 1 wt. % of an inhibitor, wherein the wt. % in all instances is based on total weight of the photopolymerizable composition, wherein at least one of R$_1$, R$_2$, and R$_3$ is an alkyl group, and wherein the amine-functional (meth)acrylate monomer is not an amide.

In a second aspect, the present invention is directed to a process of producing a photopolymerizable composition, the process comprising blending: a) from 40 wt. % to 70 wt. % of at least one urethane component; b) from 25 wt. % to 70 wt % of at least one monofunctional reactive diluent; c) from 0.1 wt. % to 5 wt. % of at least one initiator; and d) from 2 wt. % to 10 wt % of an amine-functional (meth)acrylate monomer of formula, C=C—CO—O—R$_1$—NR$_2$R$_3$(I); e) optionally, at least one multiple-functional reactive diluent; f) optionally, from 0.001 wt. % to 1 wt. % of an inhibitor, wherein the wt. % in all instances is based on total weight of the photopolymerizable composition, wherein at least one of R$_1$, R$_2$, and R$_3$ is an alkyl group, and wherein the amine-functional (meth)acrylate monomer is not an amide.

In a third aspect, the present invention is directed to a process of producing a three-dimensional object from the inventive photopolymerizable composition comprising the steps of: A) depositing the photopolymerizable composition according to the first aspect atop a carrier to obtain a layer of a construction material joined to the carrier which corresponds to a first selected cross section of the precursor; B) depositing the photopolymerizable composition atop a previously applied layer of the construction material to obtain a further layer of the construction material which corresponds to a further selected cross section of the precursor and which is joined to the previously applied layer, C) repeating step B) until the precursor is formed, wherein the depositing of the photopolymerizable composition at least in step B) comprises introducing energy to a selected region of the photopolymerizable composition corresponding to the respectively selected cross section of the object.

The components of the photopolymerizable composition of the present invention will now be described for the purposes of illustration and not limitation:

Urethane Component

The photopolymerizable composition of the present disclosure includes at least one urethane component. As used herein, a "urethane component" refers to a compound including one or more carbamate functionalities in the backbone of the compound. In certain embodiments, the carbamate functionality is as shown below:

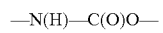

—N(H)—C(O)O—

Urethanes are prepared by the reaction of an isocyanate with an alcohol to form carbamate linkages. Moreover, the term "polyurethane" has been used more generically to refer to the reaction products of polyisocyanates with any polyactive hydrogen compound including polyfunctional alcohols, amines, and mercaptans.

The at least one urethane component provides both toughness (e.g., at least a minimum tensile strength and/or modulus) and flexibility (e.g., at least a minimum elongation at break) to the final article. In some embodiments, in addition to the urethane functionality, the urethane component further comprises one or more functional groups selected from hydroxyl groups, carboxyl groups, amino groups, and siloxane groups. These functional groups can be reactive with other components of the photopolymerizable composition during polymerization. The urethane component often comprises a urethane (meth)acrylate, a urethane acrylamide, or combinations thereof, and wherein the at least one urethane component comprises a linking group selected from alkyl, polyalkylene, polyalkylene oxide, aryl, polycarbonate, polyester, polyamide, and combinations thereof. As used herein, "linking group" refers to a functional group that connects two or more urethane groups. The linking group may be divalent, trivalent, or tetravalent. In select embodiments, the at least one urethane component comprises a urethane (meth)acrylate comprising a polyalkylene oxide linking group, a polyamide linking group, or combinations thereof.

For example, the polymerizable component can include polyfunctional urethane acrylates or urethane methacrylates. These urethane (meth)acrylates are known to the person skilled in the art and can be prepared in a known manner by, for example, reacting a hydroxyl-terminated polyurethane with acrylic acid, methacrylic acid, or isocyanatoethyl methacrylate, or by reacting an isocyanate-terminated prepolymer with hydroxyalkyl (meth)acrylates to give the urethane (meth)acrylate. Suitable processes are disclosed, e.g., in U.S. Pat. Nos. 8,329,776 and 9,295,617. Suitable urethane methacrylates can include aliphatic urethane methacrylates, aliphatic polyester urethane methacrylates, and aliphatic polyester triurethane acrylates.

The urethane component comprises a number average molecular weight ($M_n$) of 200 grams per mole to 5,000 grams per mole. "Urethane component" as used herein optionally includes a "high $M_n$ urethane component" and a "low $M_n$ urethane component". The high $M_n$ urethane component includes compounds having one or more urethane functionalities in the backbone of the compound and has a number average molecular weight of 1,000 grams per mole (g/mol) or greater.

In certain embodiments, at least one urethane component comprises at least one (meth)acrylate component having a urethane moiety, which may help to improve physical properties of the cured composition like flexural strength and/or elongation at break. Such a urethane component may have the following features: a) at least 2 to 4 (meth)acrylate moieties; b) a number average molecular weight ($M_n$) of from 1,000 to 5,000 g/mol; c) a $C_1$ to $C_{20}$ linear or branched alkyl moiety to which the (meth)acrylate moieties are attached through urethane moieties; d) a viscosity of from 0.1 to 100 Pas at 23° C. A combination of these features may sometimes be preferred.

Urethane (meth)acrylates may be obtained by a number of processes known to those skilled in the art. The urethane (meth)acrylates may be obtained by reacting an NCO-terminated compound with a suitable monofunctional (meth)acrylate monomer, such as hydroxyethyl acrylate, hydroxyethyl methacrylate, hydroxypropylmethacrylate. For example, a polyisocyanate and a polyol may be reacted to form an isocyanate-terminated urethane prepolymer that is subsequently reacted with a (meth)acrylate such as 2-hydroxy ethyl(meth)acrylate. Such reactions may be conducted at room temperature or higher temperature, optionally in the presence of catalysts, such as tin catalysts and tertiary amines.

Polyisocyanates employed in the various embodiments to form isocyanate-functional urethane prepolymers can be any organic isocyanate having at least two free isocyanate groups, including aliphatic cycloaliphatic, aromatic and araliphatic isocyanates. Any of the known polyisocyanates such as alkyl and alkylene polyisocyanates, cycloalkyl and cycloalkylene polyisocyanates, and combinations thereof may be useful.

Suitable diisocyanates are of the formula:

wherein X is an $C_2$ to $C_{12}$ aliphatic hydrocarbon radical, a $C_5$ to $C_{18}$ cycloaliphatic hydrocarbon radical, a $C_6$ to $C_{16}$ aromatic hydrocarbon radical or a $C_7$ to $C_{15}$ aliphatic hydrocarbon radical.

Examples of suitable polyisocyanates include, but are not limited to, 2,2,4-trimethylhexamethylene-1,6-diisocyanate, hexamethylene-1,6-diisocyanate (HDI), cyclohexyl-1,4-diisocyanate, 4,4'-methylene-bis(cyclohexyl isocyanate), 1,1'-methylenebis(4-isocyanato) cyclohexane, isophorone diisocyanate, 4,4'-methylene diphenyl diisocyanate, 1,4-tetramethylene diisocyanate, meta- and para-tetra methylxylene diisocyanate, 1,4-phenylene diisocyanate, 2,6- and 2,4-toluene diisocyanate, 1,5-naphthylene diisocyanate, 2,4' and 4,4'-diphenylmethane diisocyanate and mixtures thereof.

It is also possible to use higher-functional polyisocyanates known from polyurethane chemistry or else modified polyisocyanates, for example containing carbodiimide groups, allophanate groups, isocyanurate groups and/or biuret groups. Particularly preferred isocyanates are isophorone diisocyanate, 2,4,4-trimethyl-hexamethylene diisocyanate and higher-functional polyisocyanates with isocyanurate structure.

The isocyanate-terminated urethane compound is capped with a (meth)acrylate to produce a urethane(meth)acrylate compound. In general, any (meth)acrylate-type capping agent having a terminal hydroxyl group and also having an acrylic or methacrylic moiety can be employed, with the methacrylic moiety being preferred. Suitable capping agents include, but are not limited to, 2-hydroxyethyl acrylate (HEA), 2-hydroxyethyl(meth)acrylate (HEMA), 2-hydroxypropyl (meth)acrylate, glycerol di(meth)acrylate and/or trimethylolpropane di(meth)acrylate. Particularly preferred are 2-hydroxyethyl methacrylate and 2-hydroxyethyl acrylate.

In various embodiments, the equivalence ratio of isocyanate groups to compounds reactive with isocyanate groups is 1.1:1 to 4:1, in certain embodiments, 1.25:1 to 2:1.

The isocyanate polyaddition reaction can take place in the presence of catalysts known from polyurethane chemistry, for example organotin compounds such as dibutyltin dilaurate or amine catalysts such as diazabicyclo[2.2.2]octane. Furthermore, the synthesis may take place both in the melt or in a suitable solvent or a reactive diluent as described below which may be added before or during the prepolymer preparation. Suitable solvents are for example acetone, 2-butanone, tetrahydrofuran, dioxane, dimethylformamide, N-methyl-2-pyrrolidone (NMP), ethyl acetate, alkyl ethers of ethylene and propylene glycol and aromatic hydrocarbons. The use of ethyl acetate as solvent is particularly preferred.

The urethane component is included in the photopolymerizable composition in an amount of 40 to 70 wt. %, based on the total weight of the photopolymerizable composition.

Reactive Diluent

The photopolymerizable compositions of the present disclosure include at least one monofunctional reactive diluent. A "reactive diluent," as used herein, means a component that contains at least one free radically reactive group (e.g., an ethylenically-unsaturated group) that can co-react with the at least one urethane component (e.g., is capable of undergoing addition polymerization). The reactive diluent has a smaller molecular weight than at least one (e.g., high $M_n$) urethane component, often less than 400 grams per mole, and does not contain any urethane functional groups (e.g., is free of any urethane functional groups).

In select embodiments, the (at least one) monofunctional reactive diluent comprises a (meth)acrylate, an alkyl (meth)acrylate, a phenoxy (meth)acrylate, a hydroxy alkyl (meth)acrylate, or a combination thereof. In some preferred embodiments, the monofunctional reactive diluent comprises phenoxy ethyl methacrylate, such as in an amount of 20 to 80 wt. % of the total amount of the total monofunctional reactive diluent content.

Suitable free-radically polymerizable monofunctional diluents include phenoxy ethyl(meth)acrylate, phenoxy-2- methylethyl(meth)acrylate, phenoxyethoxyethyl(meth)acrylate, 3-hydroxy-2-hydroxypropyl(meth)acrylate, benzyl (meth)acrylate, phenylthio ethyl acrylate, 2-naphthylthio ethyl acrylate, 1-naphthylthio ethyl acrylate, 2,4,6-tribromophenoxy ethyl acrylate, 2,4-dibromophenoxy ethyl acrylate, 2-bromophenoxy ethyl acrylate, 1-naphthyloxy ethyl acrylate, 2-naphthyloxy ethyl acrylate, phenoxy 2-methylethyl acrylate, phenoxyethoxyethyl acrylate, 3-phenoxy-2-hydroxy propyl acrylate, 2,4-dibromo-6-sec-butylphenyl acrylate, 2,4-dibromo-6-isopropylphenyl (meth)acrylate, benzyl (meth)acrylate, phenyl (meth)acrylate, tetrahydrofurfuryl (meth)acrylate, alkoxylated tetrahydrofurfuryl acrylate, ethoxylated nonyl phenol (meth)acrylate, alkoxylated lauryl (meth)acrylate, alkoxylated phenol (meth)acrylate, stearyl (meth)acrylate, tetrahydrofurfuryl (meth)acrylate, lauryl (meth)acrylate, isodecyl (meth)acrylate, isooctyl (meth)acrylate, octadecyl (meth)acrylate, tridecyl (meth)acrylate, ethoxylated (4) nonyl phenol (meth)acrylate, caprolactone (meth)acrylate, cyclic trimethylolpropane formal (meth)acrylate, 3,3,5-trimethylcyclohexyl (meth)acrylate, dicyclopentadienyl (meth)acrylate, isobutyl (meth)acrylate, n-butyl (meth)acrylate, ethyl hexyl (meth)acrylate, isobornyl (meth)acrylate, and 2,4,6-tribromophenyl (meth)acrylate.

Some embodiments of the invention optionally include a multifunction reactive diluent. Suitable free-radically polymerizable multifunctional reactive diluents include di-, tri-, or other poly-acrylates and methacrylates such as glycerol diacrylate, ethoxylated bisphenol A dimethacrylate (D-zethacrylate), tetraethylene glycol dimethacrylate (TEGDMA), polyethyleneglycol dimethacrylate (PEGDMA), glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyldimethylmethane, bis[1-(3-acryloxy-2-hydroxy)]-p-propoxyphenyldimethylmethane, and trishydroxyethyl-isocyanurate trimethacrylate; bis-acrylates of polyesters (e.g., methacrylate-terminated polyesters); the bis-acrylates and bis-methacrylates of polyethylene glycols of molecular weight 200-500, copolymerizable mixtures of acrylated monomers such as those in U.S. Pat. No. 4,652,274, acrylated oligomers such as those of U.S. Pat. No. 4,642,126; and polyfunctional (meth)acrylates comprising urea or amide groups, such as those of EP2008636.

The reactive diluent can comprise one or more poly(meth)acrylates, for example, di-, tri-, tetra- or pentafunctional monomeric or oligomeric aliphatic, cycloaliphatic, or aromatic acrylates or methacrylates.

Examples of suitable aliphatic poly(meth)acrylates having more than two (meth)acrylate groups in their molecules are the triacrylates and trimethacrylates of hexane-2,4,6-triol; glycerol or 1,1,1-trimethylolpropane; ethoxylated or propoxylated glycerol or 1,1,1-trimethylolpropane; and the hydroxyl-containing tri(meth)acrylates which are obtained by reacting triepoxide compounds, for example the triglycidyl ethers of said triols, with (meth)acrylic acid. It is also possible to use, for example, pentaerythritol tetraacrylate, bistrimethylolpropane tetraacrylate, pentaerythritol monohydroxytriacrylate or -methacrylate, or dipentaerythritol monohydroxypentaacrylate or -methacrylate.

Another suitable class of free radical polymerizable compounds includes aromatic di(meth)acrylate compounds and trifunctional or higher functionality (meth)acrylate compound. Trifunctional or higher functionality meth(acrylates) can be tri-, tetra- or pentafunctional monomeric or oligomeric aliphatic, cycloaliphatic, or aromatic acrylates or methacrylates.

Examples of suitable aliphatic tri-, tetra- and pentafunctional (meth)acrylates are the triacrylates and trimethacrylates of hexane-2,4,6-triol; glycerol or 1,1,1-trimethylolpropane; ethoxylated or propoxylated glycerol or 1,1,1-trimethylolpropane; and the hydroxyl-containing tri(meth)acrylates which are obtained by reacting triepoxide compounds, for example the triglycidyl ethers of said triols, with (meth)acrylic acid. It is also possible to use, for example, pentaerythritol tetraacrylate, bistrimethylolpropane tetraacrylate, pentaerythritol monohydroxytriacrylate or -methacrylate, or dipentaerythritol monohydroxypentaacrylate or -methacrylate. In some embodiments, tri(meth)acrylates comprise 1,1-trimethylolpropane triacrylate or methacrylate, ethoxylated or propoxylated 1,1,1-trimethylolpropanetriacrylate or methacrylate, ethoxylated or propoxylated glycerol triacrylate, pentaerythritol monohydroxy triacrylate or methacrylate, or tris(2-hydroxy ethyl) isocyanurate triacrylate. Further examples of suitable aromatic tri(meth)acrylates are the reaction products of triglycidyl ethers of trihydroxy benzene and phenol or cresol novolaks containing three hydroxyl groups, with (meth) acrylic acid.

In some cases, a reactive diluent comprises diacrylate and/or dimethacrylate esters of aliphatic, cycloaliphatic or aromatic diols, including 1,3- or 1,4-butanediol, neopentyl glycol, 1,6-hexanediol, dodecane diol, diethylene glycol, triethylene glycol, tetraethylene glycol, polyethylene glycol, tripropylene glycol, ethoxylated or propoxylated neopentyl glycol, 1,4-dihydroxymethylcyclohexane, 2,2-bis(4-hydroxycyclohexyl)propane or bis(4-hydroxycyclohexyl) methane, hydroquinone, 4,4'-dihydroxybiphenyl, bisphenol A, bisphenol F, bisphenol S, ethoxylated or propoxylated bisphenol A, ethoxylated or propoxylated bisphenol F or ethoxylated or propoxylated bisphenol S. In some cases, a reactive diluent described herein comprises one or more higher functional acrylates or methacrylates such as dipentaerythritol monohydroxy pentaacrylate or bis(trimethylolpropane)tetraacrylate.

In various embodiment comprising a multifunctional reactive diluent, one or more multifunctional reactive diluents are present in an amount of 1 to 30 wt. %, based on the total weight of the photopolymerizable composition. In certain other embodiments, the photopolymerizable composition consists essentially of monofunctional components or is free of multifunctional components. This means that the photopolymerizable composition contains 2 wt. % or less of multifunctional components. A significant amount of the monofunctional reactive diluents may be incorporated into the reaction product of the photopolymerizable composition during photopolymerization. This means that a relatively small amount of unreacted monofunctional reactive diluent remains in the reaction product and could be extracted from the cured composition, particularly after subjection of the cured composition to a post-cure step. In certain embodiments, 10% or less of unreacted monofunctional reactive diluent is present in a cured or post-cured article.

In select embodiments, two or more reactive diluents are prepolymerized such that up to 20% of the functional groups of the reactive diluents are reacted prior to inclusion in the photopolymerizable composition. The prepolymerization is typically performed via initiation with a small amount of photoinitiator added to the reactive diluents. One representative prepolymerization process is described in detail in the Examples below. An advantage of prepolymerizing a portion of the reactive diluent(s) is the formation of a semi-interpenetrative polymer network. Also, the prepolymerization tends to assist in producing higher molecular weight chains in the reaction product of the photopolymerizable composition as compared to the same composition that is not prepolymerized.

In certain embodiments, the at least one reactive diluent comprises a molecular weight of 200 g/mol to 400 g/mol. The reactive diluent is included in the photopolymerizable composition in an amount of 25 to 70 wt. %, wherein the wt. % in all instances is based on total weight of the photopolymerizable composition.

Amine-Functional (Meth)Acrylate Monomer

The photopolymerizable composition of the present disclosure includes from 2 wt. % to 10 wt % of at least one amine-functional (meth)acrylate monomer of the formula (I),

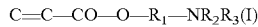

C=C—CO—O—R$_1$—NR$_2$R$_3$(I)

to the resin, wherein at least one of R$_1$, R$_2$, and R$_3$ is an alkyl group, wherein the wt. % in all instances is based on total weight of the photopolymerizable composition, and wherein the at least one amine-functional (meth)acrylate monomer is not an amide. examples of such one amine-functional (meth) acrylate monomers include, but are not limited to, diethylaminoethyl methacrylate (DEAEMA), diethylaminoethyl acrylate (DEAEA), dimethylaminoethyl methacrylate (DMAEMA), 2-(diisopropylamino)ethyl methacrylate (DIPAEMA), and N-[3-(dimethylamino)propyl]methacrylamide (DMAPMAM), all commercially available from a variety of suppliers such as Sigma-Aldrich.

Initiator

The photopolymerizable composition further comprises one or more photoinitiators, for instance two photoinitiators. Suitable exemplary photoinitiators include, but are not limited to the various IRGACURE and DAROCUR from BASF such as 1-hydroxycyclohexyl phenyl ketone (IRGACURE 184), 2,2-dimethoxy-1,2-diphenylethan-1-one (IRGACURE 651), bis(2,4,6 trimethylbenzoyl)phenylphosphineoxide (IRGACURE 819), 1-[4-(2-hydroxyethoxy)phenyl]-2-hydroxy-2-methyl-1-propane-1-one (IRGACURE 2959), 2-benzyl-2-dimethylamino-1-(4-morpholinophenyl)butanone (IRGACURE 369), 2-methyl-1-[4-(methylthio)phenyl]-2-morpholinopropan-1-one (IRGACURE 907), Oligo [2-hydroxy-2-methyl-1[4-(1-methylvinyl)phenyl] propanone] ESACURE ONE (Lamberti S. p. A., Gallarate, Italy), 2-hydroxy-2-methyl-1-phenyl propan-1-one (DAROCUR 1173), 2,4,6-trimethylbenzoyldiphenylphosphine oxide (IRGACURE TPO), and 2,4,6-trimethylbenzoylphenyl phosphinate (IRGACURE TPO-L). Additional suitable photoinitiators include, benzyl dimethyl ketal, 2-methyl-2-hydroxypropiophenone, benzoin methyl ether, benzoin isopropyl ether, anisoin methyl ether, aromatic sulfonyl chlorides, photoactive oximes, and combinations thereof.

The photoinitiator may be present in a photopolymerizable composition described herein in any amount according to the particular constraints of the additive manufacturing process. In some embodiments, a photoinitiator is present in a photopolymerizable composition in an amount of up to 5% by weight, based on the total weight of the photopolymerizable composition. In some cases, a photoinitiator is present in an amount of 0.1-5% by weight, based on the total weight of the photopolymerizable composition.

A thermal initiator may be present in a photopolymerizable composition described herein in any amount according to the particular constraints of the additive manufacturing process. In some embodiments, a thermal initiator is present in a photopolymerizable composition in an amount of up to 5% by weight, based on the total weight of the photopolymerizable composition. In some cases, a thermal initiator is present in an amount of 0.1-5% by weight, based on the total weight of the photopolymerizable composition. Suitable thermal initiators include for instance and without limitation, peroxides such as benzoyl peroxide, dibenzoyl peroxide, dilauryl peroxide, cyclohexane peroxide, methyl ethyl ketone peroxide, hydroperoxides, e.g., tert-butyl hydroperoxide and cumene hydroperoxide, dicyclohexyl peroxydicarbonate, 2,2,-azo-bis(isobutyronitrile), and t-butyl perbenzoate. Examples of commercially available thermal initiators include initiators available from DuPont Specialty Chemical (Wilmington, Del.) under the VAZO trade designation including VAZO 67 (2,2'-azo-bis(2-methybutyronitrile)) VAZO 64 (2,2'-azo-bis(isobutyronitrile)) and VAZO 52 (2,2'-azo-bis(2,2-dimethyvaleronitrile)), and LUCIDOL 70 from Elf Atochem North America.

In certain embodiments, the use of more than one initiator can assist in increasing the percentage of reactive diluent that gets incorporated into the reaction product and thus decreasing the percentage of the reactive diluent that remains uncured. Reaction of monofunctional reactive diluent(s) in particular is desirable to minimize the presence of unreacted diluent in the product following polymerization.

In addition, a photopolymerizable material composition described herein can further comprise one or more sensitizers to increase the effectiveness of one or more photoinitiators that may also be present. In some embodiments, a sensitizer comprises isopropylthioxanthone (ITX) or 2-chlorothioxanthone (CTX). Other sensitizers may also be used. If used in the photopolymerizable composition, a sensitizer can be present in an amount ranging of 0.01% by weight to 1% by weight, based on the total weight of the photopolymerizable composition.

Additives

The photopolymerizable composition described herein optionally also comprises one or more additives such as polymerization inhibitors, stabilizing agents, absorption modifiers, fibrous reinforcement, and colorants. A polymerization inhibitor is often included in a photopolymerizable composition to provide additional thermal stability to the composition. A stabilizing agent, in some instances, comprises one or more antioxidants. Any antioxidant not inconsistent with the objectives of the present disclosure may be used. In some embodiments, for example, suitable antioxidants include various aryl compounds, including butylated hydroxytoluene (BHT), which can also be used as a polymerization inhibitor in embodiments described herein. In addition to or as an alternative, a polymerization inhibitor comprises methoxyhydroquinone (MEHQ).

In some embodiments, a polymerization inhibitor, if used, is present in an amount of 0.001-2% by weight, by weight, based on the total weight of the photopolymerizable composition. Further, if used, a stabilizing agent is present in a photopolymerizable composition described herein in an amount of 0.1-5% by weight, based on the total weight of the photopolymerizable composition.

The photopolymerizable composition as described herein can also comprise one or more absorption modifiers (e.g., dyes, optical brighteners, pigments, particulate fillers, etc.) to control the penetration depth of actinic radiation. One particularly suitable absorption modifier is TINOPAL OB, a benzoxazole, 2,2'-(2,5-thiophenediyl)bis[5-(1,1-dimethylethyl)], available from BASF Corporation. The absorption modifier, if used, can be present in an amount of 0.001-5% by weight, based on the total weight of the photopolymerizable composition.

Photopolymerizable compositions may include fillers, including nano-scale fillers. Examples of suitable fillers are naturally occurring or synthetic materials including, but not limited to: silica ($SiO_2$ (e.g., quartz)); alumina ($Al_2O_3$), zirconia, nitrides (e.g., silicon nitride); glasses and fillers derived from, for example, Zr, Sr, Ce, Sb, Sn, Ba, Zn, and Al; feldspar; borosilicate glass; kaolin (china clay); talc; zirconia; titania; and submicron silica particles (e.g., pyrogenic silicas such as those available under the names AEROSIL, including "OX 50," "130," "150" and "200" silicas from Degussa Corp. and CAB-O-SIL M5 and TS-720 silica from Cabot Corp.). Organic fillers made from polymeric materials are also possible, such as those disclosed in International Publication No. WO09/045752.

The invention also provides a process of producing a three-dimensional object, the process comprising the steps of: A) depositing the photopolymerizable composition according to the invention atop a carrier to obtain a layer of a construction material joined to the carrier which corresponds to a first selected cross section of the precursor; B) depositing additional photopolymerizable composition atop a previously applied layer of the construction material to obtain a further layer of the construction material which corresponds to a further selected cross section of the precursor and which is joined to the previously applied layer, C) repeating step B) until the precursor is formed, wherein the depositing of the photopolymerizable composition at least in step B) comprises introducing energy to a selected region of the photopolymerizable composition corresponding to the respectively selected cross section of the object.

In the process according to the invention, the object is thus obtained in a production phase which may also be called a construction phase. This construction phase may be realized by means of ray-optic additive manufacturing processes such as stereolithography or the DLP (digital light processing) process or by inkjet printing processes combined with radiative crosslinking and forms the subject matter of the steps A), B) and C). In the context of the present invention the material from which the precursor is obtained in the additive manufacturing process is referred to herein as "construction material". Step A) of the process involves depositing the photopolymerizable composition atop a carrier. This is usually the first step in stereolithography and DLP processes. In this way a layer of a construction material joined to the carrier which corresponds to a first selected cross section of the precursor is obtained.

According to step B), this step B) is repeated until the desired precursor is formed. Step B) comprises depositing additional photopolymerizable composition atop a previously applied layer of the construction material to obtain a further layer of the construction material which corresponds to a further selected cross section of the precursor and which is joined to the previously applied layer. The previously applied layer of the construction material may be the first layer from step A) or a layer from a previous run of step B).

Also in accordance with the invention, the depositing of the photopolymerizable composition at least in step B) (preferably also in step A) comprises exposure and/or irradiation of a selected region of the photopolymerizable composition corresponding to the respectively selected cross section of the object. The photopolymerizable composition is converted into the crosslinked resin by exposure and/or irradiation which triggers free-radical crosslinking reactions. "Exposure" as used herein means introduction of light in the range between near-IR and near-UV light (wavelengths of 1400 nm to 315 nm). The remaining shorter wavelength ranges are covered by the term "irradiation", for example, far UV light, x-ray radiation, gamma radiation and electron radiation.

The selection of the respective cross section may be accomplished by use of a CAD program, with which a model of the object to be produced has been generated. This operation is also known as "slicing" and serves as a basis for controlling the exposure and/or irradiation of the photopolymerizable composition.

A variety of different three-dimensional printing processes for forming objects are known to those skilled in art, such as those described in U.S. Pat. Nos. 9,453,142; and 10,793,745; and in U.S. Pat. Pub. 2021/0054125. These and other processes not mentioned here may use the inventive photopolymerizable composition to produce objects.

EXAMPLES

The non-limiting and non-exhaustive examples that follow are intended to further describe various non-limiting and non-exhaustive embodiments without restricting the scope of the embodiments described in this specification. All quantities given in "parts" and "percents" are understood to be by weight, unless otherwise indicated.

| | |
|---|---|
| POLYISOCYANATE A | 3-isocyanatomethyl-3,5,5-trimethylcyclohexyl-isocyanate having an NCO group content of about 37.8%, commercially available from Covestro LLC; |
| POLYOL A | a linear, hydroxyl-terminated, aliphatic polycarbonate diol with a molecular weight of 1,006.3 g/mol, an OH number of 111.5 mg KOH/g, commercially available from Covestro LLC (Pittsburgh, PA) as DESMOPHEN C2100; |
| POLYOL B | a linear, hydroxyl-terminated, aliphatic polycarbonate diol with a molecular weight of 644.1 g/mol, an OH number of 174.2 mg KOH/g, commercially available from Covestro LLC as DESMOPHEN C XP2716; |
| CATALYST A | dibutyltin dilaurate, commercially available from Air Products as DABCO T-12; |

-continued

| | |
|---|---|
| ACRYLATE A | 2-hydroxyalkyl methacrylate (HEMA), commercially available from Sigma-Aldrich; |
| REACTIVE DILUENT A | isobornyl methacrylate (IBOMA), commercially available from Sigma-Aldrich; |
| REACTIVE DILUENT B | diethylaminoethyl methacrylate (DEAEMA), commercially available from Sigma-Aldrich; |
| REACTIVE DILUENT C | diethylaminoethyl acrylate (DEAEA), commercially available from Sigma-Aldrich; |
| REACTIVE DILUENT D | dimethylaminoethyl methacrylate (DMAEMA), commercially available from Sigma-Aldrich; |
| REACTIVE DILUENT E | 2-(diisopropylamino)ethyl methacrylate (DIPAEMA), commercially available from Sigma-Aldrich; |
| REACTIVE DILUENT F | N-[3-(dimethylamino)propyl]methacrylamide (DMAPMAM), commercially available from Sigma-Aldrich; |
| REACTIVE DILUENT G | acryloyl morpholine (ACMO), commercially available from Sigma-Aldrich; |
| REACTIVE DILUENT H | N-vinyl-2-pyrrolidone (V-pyrol), commercially available from Sigma-Aldrich; |
| PHOTOINITIATOR A | 2-hydroxy-2-methyl-1-phenylpropanone, commercially available from IGM Resins as OMNIRAD 1173; |
| STABILIZER A | phenothiozine commercially available from Sigma-Aldrich; |
| SOLVENT A | ethyl acetate; and |
| THIOL A | glycol di(3-mercaptopropionate), commercially available from BRUNO BOCK. |

Sample Preparation

Solid polyol samples were heated in an oven at 60° C. overnight before use. A 10 wt % CATALYST A solution in SOLVENT A, a 10 wt % STABILIZER A solution in SOLVENT A, and a 5 wt % BHT solution in SOLVENT A were prepared for use in prepolymer synthesis. At room temperature, the POLYOL according to Table I was mixed in SOLVENT A until it formed a homogeneous solution in a three-neck reactor fitted with a reflex condenser, a thermocouple, and mechanical stirrer. CATALYST A (100 ppm) was added into the mixture. The stirring rate was set at 500 rpm and reaction was blanketed with nitrogen. The temperature to was increased to 60° C., and POLYISOCYANATE A was added dropwise into the reactor within approximately 15 minutes. A dry ice bath was used to cool the reactor to keep the solution temperature lower than 70° C. After one hour, the NCO content was titrated against the NCO target in the first step prior to adding ACRYLATE A. If the NCO content was not at the target, the reaction was continued for an additional 30 minutes until reaching the target. Then, STABILIZER A (50 ppm) and additional CATALYST A (100 ppm) were added into the reactor. ACRYLATE A was added into the solution within 15 minutes. The NCO content was titrated after 60 min and the reaction was stopped after the NCO content was less than 0.2 wt %. Finally, the reaction was cooled to room temperature. The NCO was titrated and BHT (100 ppm) was added to the solution. The four prepolymers so made are provided in Table I.

TABLE I

| Urethane Prepolymer | Polyol | NCO/OH index | Theoretical MW (g/mol) |
|---|---|---|---|
| A | A | 2.00 | 1714.8 |
| B | B | 1.50 | 2220.8 |
| C | B | 1.25 | 3956.6 |
| D | A | 1.50 | 2945.2 |

Film Preparation and Evaluation

The prepolymers listed in Table I, synthesized in SOLVENT A at 75 wt % were mixed with the reactive diluent as listed in Tables II and II along with PHOTOINITIATOR A (3 wt % based on prepolymer solid) using a speed mixer, cast into 400 μm wet films and cured using a LIBERTY CONVEYOR UV oven. UV cure conditions were 200 W/in 105 amps: 14 fpm (1530 mJ/cm$^2$) double pass; post thermal cure after drying under ambient conditions and then dried at 80, 100, and 125° C. for 30 minutes each.

Film samples were cut into dog-bone shaped samples using a Type C die. The tensile tests were measured according to ASTM D412 at 23° C. under 50% relative humidity. An INSTRON 5900R testing machine was used with 10 kN load cell. The pull speed was 50 mm/min. Nominal tensile properties are reported in Tables II.

As can be appreciated by reference to Table II, the addition of 5-10 wt % of amine-functional (meth)acrylate monomers as reactive diluent monomers in resin formulations improved the film elongation at break without significantly affecting other tensile properties. Further, using a different type of amine functional (meth)acrylate monomer as the reactive diluent demonstrated comparable results. Without wishing to be bound to any theory, the present inventor speculates that the aliphatic amine group is a key requirement. The less active nitrogen in the amide group in, for example, N-vinyl-2-pyrrolidone and acryloyl morpholine, did not act as a chain transfer group. In comparison, a thiol transfer agent was much less effective.

TABLE II

| Example | URETHANE PREPOLYMER (wt. in film formulation) | REACTIVE DILUENT (wt. in film formulation) | PHOTO-INITIATOR (wt. in film formulation) | Tensile properties | | | | |
|---|---|---|---|---|---|---|---|---|
| | | | | Tensile modulus (MPa) | Tensile stress at break (MPa) | Yield stress (MPa) | Elongation at break (%) | Yield elongation (%) |
| II-1 | A (20) | A (20) | A (1.2) | 1794 | 30.7 | 38.7 | 19.1 | 3.9 |
| II-2 | A (20) | A (18) B (2) | A (1.2) | 1880 | 34.9 | 41.9 | 47.7 | 3.8 |
| II-3 | A (20) | A (12) | A (1.2) | 1271 | 37 | 26 | 68.8 | 4.7 |
| II-4* | A (28) | A (10) + C (2) | A (1.2) | 979 | 41 | 19.7 | 88.5 | 5.1 |
| II-5* | B (28) | A (10) + C (2) | A (1.2) | 1206 | 32.4 | 20.7 | 96 | 4.7 |
| II-6* | C (28) | A (10) + C (2) | A (1.2) | 108.1 | 11.9 | — | 219.2 | — |
| II-7 | B (28) | A (12) | A (1.2) | 1411 | 31.4 | 28 | 78.3 | 4.3 |
| II-8 | C (28) | A (12) | A (1.2) | 725 | 26.8 | 15.7 | 142.9 | 6.1 |
| II-9 | B (32) | A (16) + THIOL A (0.4) | A (1.2) | NA** | | | | |
| III-1* | D (10) | A (9)/C (1) | A (0.6) | 1105 | 32.8 | 24.3 | 107.1 | 4.7 |
| III-2* | D (10) | A (9)/D (1) | A (0.6) | 1463 | 37 | 32.5 | 93.8 | 4.3 |
| III-3* | D (10) | A (9)/B (1) | A (0.6) | 1349 | 33.4 | 28.4 | 92.1 | 4.35 |
| III-4* | D (10) | A (9)/E (1) | A (0.6) | 1350 | 34.4 | 29.9 | 86.3 | 4.3 |
| III-5* | D (10) | A (9.5)/F (0.5) | A (0.6) | 1426 | 32.3 | 30.2 | 89.1 | 4.4 |
| III-6 | D (10) | A (9)/H (1) | A (0.6) | 1551 | 32.4 | 33.5 | 62.8 | 4.1 |
| III-7 | D (10) | A (10) | A (0.6) | 1337 | 28.7 | 27.8 | 60.9 | 4.2 |
| III-8 | D (10) | A (9)/G (1) | A (0.6) | 1532 | 25.7 | 34.7 | 10.5 | 3.8 |

*inventive Examples.
**slow cure resulted in an under-cured, soft film; increased cure energy resulted in a more brittle film.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112(a), and 35 U.S.C. § 132(a).

Various aspects of the subject matter described herein are set out in the following numbered clauses:

Clause 1. A photopolymerizable composition comprising a blend of: a) from 40 wt. % to 70 wt. % of at least one urethane component; b) from 25 wt. % to 70 wt % of at least one monofunctional reactive diluent; c) from 0.1 wt. % to 5 wt. % of at least one initiator; and d) from 2 wt. % to 10 wt % of at least one amine-functional (meth)acrylate monomer of formula (I), $C=C-CO-O-R_1-NR_2R_3$(I); e) optionally, at least one multiple-functional reactive diluent; f) optionally, from 0.001 wt. % to 1 wt. % of an inhibitor, wherein the wt. % in all instances is based on total weight of the photopolymerizable composition, wherein at least one of $R_1$, $R_2$, and $R_3$ is an alkyl group, and wherein the at least one amine-functional (meth)acrylate monomer is not an amide.

Clause 2. The photopolymerizable composition according to Clause 1, wherein the at least one urethane component comprises a polyisocyanate selected from the group consisting of 2,2,4-trimethylhexamethylene-1,6-diisocyanate, hexamethylene-1,6-diisocyanate (HDI), cyclohexyl-1,4-diisocyanate, 4,4'-methylene-bis(cyclohexyl isocyanate), 1,1'-methylenebis(4-isocyanato) cyclohexane, isophorone diisocyanate, 4,4'-methylene diphenyl diisocyanate, 1,4-tetramethylene diisocyanate, meta-tetra methylxylene diisocyanate, para-tetra methylxylene diisocyanate, 1,4-phenylene diisocyanate, 2,6-toluene diisocyanate, 2,4-toluene diisocyanate, 1,5-naphthylene diisocyanate, 2,4'-diphenylmethane diisocyanate 4,4'-diphenylmethane diisocyanate, trimers of any of these, prepolymers of any of these, isomers of any of these, allophanates of any of these, and combinations of any of these.

Clause 3. The photopolymerizable composition according to one of Clauses 1 and 2, wherein the at least one monofunctional reactive diluent is selected from the group consisting of include phenoxy ethyl(meth)acrylate, phenoxy-2-methylethyl(meth)acrylate, phenoxyethoxyethyl(meth)acrylate, 3-hydroxy-2-hydroxypropyl(meth)acrylate, benzyl (meth)acrylate, phenylthio ethyl acrylate, 2-naphthylthio ethyl acrylate, 1-naphthylthio ethyl acrylate, 2,4,6-tribromophenoxy ethyl acrylate, 2,4-dibromophenoxy ethyl acrylate, 2-bromophenoxy ethyl acrylate, 1-naphthyloxy ethyl acrylate, 2-naphthyloxy ethyl acrylate, phenoxy 2-methylethyl acrylate, phenoxyethoxyethyl acrylate, 3-phenoxy-2-hydroxy propyl acrylate, 2,4-dibromo-6-sec-butylphenyl acrylate, 2,4-dibromo-6-isopropylphenyl (meth)acrylate, benzyl (meth)acrylate, phenyl (meth)acrylate, tetrahydrofurfuryl (meth)acrylate, alkoxylated tetrahydrofurfuryl acrylate, ethoxylated nonyl phenol (meth)acrylate, alkoxylated lauryl (meth)acrylate, alkoxylated phenol (meth)acrylate, stearyl (meth)acrylate, tetrahydrofurfuryl (meth)acrylate, lauryl (meth)acrylate, isodecyl (meth)acrylate, isooctyl (meth)acrylate, octadecyl (meth)acrylate, tridecyl (meth)acrylate, ethoxylated (4) nonyl phenol (meth)acrylate, caprolactone (meth)acrylate, cyclic trimethylolpropane formal (meth)acrylate, 3,3,5-trimethylcyclohexyl (meth)acrylate, dicyclopentadienyl (meth)acrylate, isobutyl (meth)acrylate, n-butyl (meth)acrylate, ethyl hexyl (meth)acrylate, isobornyl (meth)acrylate, and 2,4,6-tribromophenyl (meth)acrylate.

Clause 4. The photopolymerizable composition according to any one of Clauses 1 to 3, wherein the at least one initiator is selected from the group consisting of photoinitiators and thermal initiators.

Clause 5. The photopolymerizable composition according to Clause 4, wherein the photoinitiator is selected from the group consisting of benzophenones in combination with tertiary amines, alkylbenzophenones, 4,4'-bis(dimethylamino)benzophenone, anthrone, halogenated benzophenones, benzoin, benzil ketals, acylphosphine oxides, 2,4,6-trimethylbenzoyldiphenylphosphine oxide, bisacylphosphine oxides, phenylglyoxylic esters, camphorquinone, α-aminoalkylphenones, α,α-dialkoxyacetophenones and α-hydroxyalkylphenones, phenylbis(2,4,6-trimethylbenzoyl)phosphine oxide, oligo-[2-hydroxy-2-methyl-1-[4-(1-methylvinyl)phenyl]propanones, bis(4-methoxybenzoyl)diethylgermanium, and combinations thereof.

Clause 6. The photopolymerizable composition according to Clause 4, wherein the thermal initiator is selected from the group consisting of azobisisobutyronitrile (AIBN), dibenzoylperoxide (DBPO), di-tert-butyl peroxide, inorganic peroxides, and combinations thereof.

Clause 7. The photopolymerizable composition according to any one of Clauses 1 to 6, wherein the at least one amine-functional (meth)acrylate monomer of formula (I) is selected from the group consisting of diethylaminoethyl methacrylate (DEAEMA), diethylaminoethyl acrylate (DEAEA), dimethylaminoethyl methacrylate (DMAEMA), 2-(diisopropylamino)ethyl methacrylate (DIPAEMA), and N-[3-(dimethylamino)propyl]methacrylamide (DMAPMAM).

Clause 8. The photopolymerizable composition according to any one of Clauses 1 to 7, wherein the at least one multifunctional reactive diluent is selected from the group consisting of glycerol diacrylate, ethoxylated bisphenol A dimethacrylate (D-zethacrylate), tetraethylene glycol dimethacrylate (TEGDMA), polyethyleneglycol dimethacrylate (PEGDMA), glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyldimethylmethane, bis[1-(3-acryloxy-2-hydroxy)]-p-propoxyphenyldimethylmethane, and trishydroxyethyl-isocyanurate trimethacrylate, bis-acrylates of polyesters, bis-acrylates and bis-methacrylates of polyethylene glycols of molecular weight 200-500, and copolymerizable mixtures of acrylated monomers.

Clause 9. The photopolymerizable composition according to any one of Clauses 1 to 8, wherein the at least one inhibitor is selected from the group consisting of butylated hydroxytoluene (BHT) and methoxyhydroquinone (MEHQ).

Clause 10. A process of producing a photopolymerizable composition, the process comprising blending: a) from 40 wt. % to 70 wt. % of at least one urethane component; b) from 25 wt. % to 70 wt % of at least one monofunctional reactive diluent; c) from 0.1 wt. % to 5 wt. % of at least one initiator; and d) from 2 wt. % to 10 wt % of at least one amine-functional (meth)acrylate monomer of formula, $C=C—CO—O—R_1—NR_2R_3(I)$; e) optionally, at least one multiple-functional reactive diluent; f) optionally, from 0.001 wt. % to 1 wt. % of an inhibitor, wherein the wt. % in all instances is based on total weight of the photopolymerizable composition, wherein at least one of $R_1$, $R_2$, and $R_3$ is an alkyl group, and wherein the amine-functional (meth)acrylate monomer is not an amide.

Clause 11. The process according to Clause 10, wherein the at least one urethane component comprises a polyisocyanate selected from the group consisting of 2,2,4-trimethylhexamethylene-1,6-diisocyanate, hexamethylene-1,6-diisocyanate (HDI), cyclohexyl-1,4-diisocyanate, 4,4'-methylene-bis(cyclohexyl isocyanate), 1,1'-methylenebis(4-isocyanato) cyclohexane, isophorone diisocyanate, 4,4'-methylene diphenyl diisocyanate, 1,4-tetramethylene diisocyanate, meta-tetra methylxylene diisocyanate, para-tetra methylxylene diisocyanate, 1,4-phenylene diisocyanate, 2,6-toluene diisocyanate, 2,4-toluene diisocyanate, 1,5-naphthylene diisocyanate, 2,4'-diphenylmethane diisocyanate 4,4'-diphenylmethane diisocyanate, trimers of any of these, prepolymers of any of these, isomers of any of these, allophanates of any of these, and combinations of any of these.

Clause 12. The photopolymerizable composition according to one of Clauses 10 and 11, wherein the at least one monofunctional reactive diluent is selected from the group consisting of include phenoxy ethyl(meth)acrylate, phenoxy-2-methylethyl(meth)acrylate, phenoxyethoxyethyl (meth)acrylate, 3-hydroxy-2-hydroxypropyl(meth)acrylate, benzyl(meth)acrylate, phenylthio ethyl acrylate, 2-naphthylthio ethyl acrylate, 1-naphthylthio ethyl acrylate, 2,4,6-tribromophenoxy ethyl acrylate, 2,4-dibromophenoxy ethyl acrylate, 2-bromophenoxy ethyl acrylate, 1-naphthyloxy ethyl acrylate, 2-naphthyloxy ethyl acrylate, phenoxy 2-methylethyl acrylate, phenoxyethoxyethyl acrylate, 3-phenoxy-2-hydroxy propyl acrylate, 2,4-dibromo-6-sec-butylphenyl acrylate, 2,4-dibromo-6-isopropylphenyl (meth)acrylate, benzyl (meth)acrylate, phenyl (meth)acrylate, tetrahydrofurfuryl (meth)acrylate, alkoxylated tetrahydrofurfuryl acrylate, ethoxylated nonyl phenol (meth)acrylate, alkoxylated lauryl (meth)acrylate, alkoxylated phenol (meth)acrylate, stearyl (meth)acrylate, tetrahydrofurfuryl (meth)acrylate, lauryl (meth)acrylate, isodecyl (meth)acrylate, isooctyl (meth)acrylate, octadecyl (meth)acrylate, tridecyl (meth)acrylate, ethoxylated (4) nonyl phenol (meth) acrylate, caprolactone (meth)acrylate, cyclic trimethylolpropane formal (meth)acrylate, 3,3,5-trimethylcyclohexyl (meth)acrylate, dicyclopentadienyl (meth)acrylate, isobutyl (meth)acrylate, n-butyl (meth)acrylate, ethyl hexyl (meth)acrylate, isobornyl (meth)acrylate, and 2,4,6-tribromophenyl (meth)acrylate.

Clause 13. The photopolymerizable composition according to any one of Clauses 10 to 12, wherein the at least one initiator is selected from the group consisting of photoinitiators and thermal initiators.

Clause 14. The photopolymerizable composition according to Clause 13, wherein the photoinitiator is selected from the group consisting of benzophenones in combination with tertiary amines, alkylbenzophenones, 4,4'-bis(dimethylamino)benzophenone, anthrone, halogenated benzophenones, benzoin, benzil ketals, acylphosphine oxides, 2,4,6-trimethylbenzoyldiphenylphosphine oxide, bisacylphosphine oxides, phenylglyoxylic esters, camphorquinone, α-aminoalkylphenones, α,α-dialkoxyacetophenones and α-hydroxyalkylphenones, phenylbis(2,4,6-trimethylbenzoyl)phosphine oxide, oligo-[2-hydroxy-2-methyl-1-[4-(1-methylvinyl)phenyl]propanones, bis(4-methoxybenzoyl)diethylgermanium, and combinations thereof.

Clause 15. The photopolymerizable composition according to Clause 13, wherein the thermal initiator is selected from the group consisting of azobisisobutyronitrile (AIBN), dibenzoylperoxide (DBPO), di-tert-butyl peroxide, inorganic peroxides, and combinations thereof.

Clause 16. The photopolymerizable composition according to any one of Clauses 10 to 15, wherein the at least one amine-functional (meth)acrylate monomer of formula (I) is selected from the group consisting of diethylaminoethyl methacrylate (DEAEMA), diethylaminoethyl acrylate (DEAEA), dimethylaminoethyl methacrylate (DMAEMA), 2-(diisopropylamino)ethyl methacrylate (DIPAEMA), and N-[3-(dimethylamino)propyl]methacrylamide (DMAPMAM).

Clause 17. The photopolymerizable composition according to any one of Clauses 10 to 16, wherein the at least one multifunctional reactive diluent is selected from the group consisting of glycerol diacrylate, ethoxylated bisphenol A dimethacrylate (D-zethacrylate), tetraethylene glycol dimethacrylate (TEGDMA), polyethyleneglycol dimethacrylate (PEGDMA), glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyldimethylmethane, bis[1-(3-acryloxy-2-hydroxy)]-p-propoxyphenyldimethylmethane, and trishydroxyethyl-isocyanurate trimethacrylate, bis-acrylates of polyesters, bis-acrylates and bis-methacrylates of polyethylene glycols of molecular weight 200-500, and copolymerizable mixtures of acrylated monomers.

Clause 18. The photopolymerizable composition according to any one of Clauses 10 to 17, wherein the at least one inhibitor is selected from the group consisting of butylated hydroxytoluene (BHT) and methoxyhydroquinone (MEHQ).

Clause 19. A process of producing a three-dimensional object, the process comprising the steps of: A) depositing the photopolymerizable composition according to any one of Clauses 1 to 9 atop a carrier to obtain a layer of a construction material joined to the carrier which corresponds to a first selected cross section of the precursor; B) depositing additional photopolymerizable composition atop a previously applied layer of the construction material to obtain a further layer of the construction material which corresponds to a further selected cross section of the precursor and which is joined to the previously applied layer, C) repeating step B) until the precursor is formed, wherein the depositing of the photopolymerizable composition at least in step B) further comprises introducing energy to a selected region of the photopolymerizable composition corresponding to the respectively selected cross section of the object.

Clause 20. The process according to Clause 19, wherein in step B) a plurality of energy beams simultaneously exposes and/or irradiates the selected region of the layer of the photopolymerizable composition corresponding to the respectively selected cross section of the object.

What is claimed is:

1. A photopolymerizable composition comprising a blend of:
   a) from 40 wt. % to 70 wt. % of at least one urethane component;
   b) from 25 wt. % to 70 wt % of at least one monofunctional reactive diluent;
   c) from 0.1 wt. % to 5 wt. % of at least one initiator; and
   d) from 2 wt. % to 10 wt % of at least one amine-functional (meth)acrylate monomer,
   e) optionally, at least one multiple-functional reactive diluent,
   f) optionally, from 0.001 wt. % to 1 wt. % of an inhibitor,
   wherein the wt. % in all instances is based on total weight of the photopolymerizable composition, and wherein the amine-functional (meth)acrylate monomer is selected from the group consisting of diethylaminoethyl methacrylate, diethylaminoethyl acrylate, dimethylaminoethyl methacrylate, 2-(diisopropylamino)ethyl methacrylate, and N-[3-(dimethylamino)propyl]methacrylamide.

2. The photopolymerizable composition according to claim 1, wherein the at least one urethane component comprises a polyisocyanate selected from the group consisting of 2,2,4-trimethylhexamethylene-1,6-diisocyanate, hexamethylene-1,6-diisocyanate, cyclohexyl-1,4-diisocyanate, 4,4'-methylene-bis(cyclohexyl isocyanate), 1,1'-methylenebis(4-isocyanato) cyclohexane, isophorone diisocyanate, 4,4'-methylene diphenyl diisocyanate, 1,4-tetramethylene diisocyanate, meta-tetra methylxylene diisocyanate, para-tetra methylxylene diisocyanate, 1,4-phenylene diisocyanate, 2,6-toluene diisocyanate, 2,4-toluene diisocyanate, 1,5-naphthylene diisocyanate, 2,4'-diphenylmethane diisocyanate 4,4'-diphenylmethane diisocyanate, trimers of any of these, prepolymers of any of these, isomers of any of these, allophanates of any of these, and combinations of any of these.

3. The photopolymerizable composition according to claim 1, wherein the at least one monofunctional reactive diluent is selected from the group consisting of include phenoxy ethyl(meth)acrylate, phenoxy-2-methylethyl(meth)acrylate, phenoxyethoxyethyl(meth)acrylate, 3-hydroxy-2-hydroxypropyl(meth)acrylate, benzyl(meth)acrylate, phenylthio ethyl acrylate, 2-naphthylthio ethyl acrylate, 1-naphthylthio ethyl acrylate, 2,4,6-tribromophenoxy ethyl acrylate, 2,4-dibromophenoxy ethyl acrylate, 2-bromophenoxy ethyl acrylate, 1-naphthyloxy ethyl acrylate, 2-naphthyloxy ethyl acrylate, phenoxy 2-methylethyl acrylate, phenoxyethoxyethyl acrylate, 3-phenoxy-2-hydroxy propyl acrylate, 2,4-dibromo-6-sec-butylphenyl acrylate, 2,4-dibromo-6-isopropylphenyl (meth)acrylate, benzyl (meth)acrylate, phenyl (meth)acrylate, tetrahydrofurfuryl (meth)acrylate, alkoxylated tetrahydrofurfuryl acrylate, ethoxylated nonyl phenol (meth)acrylate, alkoxylated lauryl (meth)acrylate, alkoxylated phenol (meth)acrylate, stearyl (meth)acrylate, lauryl (meth)acrylate, isodecyl (meth)acrylate, isooctyl (meth)acrylate, octadecyl (meth)acrylate, tridecyl (meth)acrylate, ethoxylated (4) nonyl phenol (meth)acrylate, caprolactone (meth)acrylate, cyclic trimethylolpropane formal (meth)acrylate, 3,3,5-trimethylcyclohexyl (meth)acrylate, dicyclopentadienyl (meth)acrylate, isobutyl (meth)acrylate, n-butyl (meth)acrylate, ethyl hexyl (meth)acrylate, isobornyl (meth)acrylate, and 2,4,6-tribromophenyl (meth)acrylate.

4. The photopolymerizable composition according to claim 1, wherein the at least one initiator is selected from the group consisting of photoinitiators and thermal initiators.

5. The photopolymerizable composition according to claim 4, wherein the photoinitiator is selected from the group consisting of benzophenones in combination with tertiary amines, alkylbenzophenones, 4,4'-bis(dimethylamino)benzophenone, anthrone, halogenated benzophenones, benzoin, benzil ketals, acylphosphine oxides, 2,4,6-trimethylbenzoyldiphenylphosphine oxide, bisacylphosphine oxides, phenylglyoxylic esters, camphorquinone, α-aminoalkylphenones, α,α-dialkoxyacetophenones and α-hydroxyalkylphenones, phenylbis(2,4,6-trimethylbenzoyl)phosphine oxide, oligo-[2-hydroxy-2-methyl-1-[4-(1-methylvinyl)phenyl]propanones, bis(4-methoxybenzoyl)diethylgermanium, and combinations thereof.

6. The photopolymerizable composition according to claim 4, wherein the thermal initiator is selected from the group consisting of azobisisobutyronitrile, dibenzoylperoxide, di-tert-butyl peroxide, inorganic peroxides, and combinations thereof.

7. The photopolymerizable composition according to claim 1, wherein the at least one multiple-functional reactive diluent is selected from the group consisting of glycerol diacrylate, ethoxylated bisphenol A dimethacrylate (D-zethacrylate), tetraethylene glycol dimethacrylate, polyethyleneglycol dimethacrylate, glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyldimethylmethane, bis[1-(3-acryloxy-2-hydroxy)]-p-propoxyphenyldimethylmethane, and tri shydroxyethyl-isocyanurate trimethacrylate, bis-acrylates of polyesters, bis-acrylates and bis-methacrylates of polyethylene glycols of molecular weight 200-500, and copolymerizable mixtures of acrylated monomers.

8. The photopolymerizable composition according to claim 1, wherein the at least one inhibitor is selected from the group consisting of butylated hydroxytoluene and methoxyhydroquinone.

9. A process of producing the photopolymerizable composition according to claim 1, the process comprising blending:
a) from 40 wt. % to 70 wt. % of at least one urethane component;
b) from 25 wt. % to 70 wt % of at least one monofunctional reactive diluent;
c) from 0.1 wt. % to 5 wt. % of at least one initiator; and
d) from 2 wt. % to 10 wt % of at least one amine-functional (meth)acrylate monomer,
e) optionally, at least one multiple-functional reactive diluent,
f) optionally, from 0.001 wt. % to 1 wt. % of an inhibitor, wherein the wt. % in all instances is based on total weight of the photopolymerizable composition, and wherein the amine-functional (meth)acrylate monomer is selected from the group consisting of diethylaminoethyl methacrylate, diethylaminoethyl acrylate, dimethylaminoethyl methacrylate, 2-(diisopropylamino)ethyl methacrylate, and N-[3-(dimethylamino)propyl]methacrylamide.

10. A process of producing a three-dimensional object, the process comprising the steps of:
A) depositing the photopolymerizable composition according to claim 1 atop a carrier to obtain a layer of a construction material joined to the carrier which corresponds to a first selected cross section of the precursor;
B) depositing additional photopolymerizable composition atop a previously applied layer of the construction material to obtain a further layer of the construction material which corresponds to a further selected cross section of the precursor and which is joined to the previously applied layer,
C) repeating step B) until the precursor is formed, wherein the depositing of the photopolymerizable composition at least in step B further comprises introducing energy to a selected region of the photopolymerizable composition corresponding to the respectively selected cross section of the object.

11. The process according to claim 10, wherein in step B) a plurality of energy beams simultaneously exposes and/or irradiates the selected region of the layer of the photopolymerizable composition corresponding to the respectively selected cross section of the object.

* * * * *